United States Patent
Ishino

Patent Number: 5,909,259
Date of Patent: Jun. 1, 1999

[54] PROJECTION TYPE LIQUID CRYSTAL DISPLAY APPARATUS WITH GREEN POLARIZATION DIFFERENT THAN RED AND BLUE POLARIZATIONS

[75] Inventor: Hirohisa Ishino, Kanagawa, Japan

[73] Assignee: Sony Corporation, Tokyo, Japan

[21] Appl. No.: 08/857,178

[22] Filed: May 15, 1997

[30] Foreign Application Priority Data

May 24, 1996 [JP] Japan .................................. 8-130127

[51] Int. Cl.$^6$ ........................... G02F 1/1335; G02B 5/30
[52] U.S. Cl. ................... 349/9; 359/498; 353/33
[58] Field of Search ...................... 349/8, 9, 5; 353/31, 353/33, 81, 121; 359/834, 490, 494, 831, 489, 496, 497, 498

[56] References Cited

U.S. PATENT DOCUMENTS

| 5,098,183 | 3/1992 | Sonehara | 353/31 |
| 5,105,265 | 4/1992 | Sato et al. | 349/8 |

*Primary Examiner*—Anita Pellman Gross
*Assistant Examiner*—Kenneth Parker
*Attorney, Agent, or Firm*—Jay H. Maioli

[57] ABSTRACT

A projection type liquid crystal display apparatus includes at least three transmission type liquid crystal display panels and a four-division dichroic prism. The three liquid crystal display panels are driven by image signals of three primary colors respectively and the three liquid crystal display panels are illuminated by three primary color lights respectively so as to obtain transmission image lights having three channels whose luminances are modulated. The dichroic prism is used so as to synthesize the transmission image lights and the synthesized image light is projected via a projecting lens. One channel of the transmission image lights passes through the dichroic prism, and the other two channels are reflected by the dichroic prism, so that the transmission image lights are synthesized, and a polarization axis of the transmission image light of one channel passing through the dichroic prism is set to a first axis, the polarization axes of the transmission image lights of the other two channels reflected by the dichroic prism are set to a second axis, and the first and second polarization axes are made perpendicular to each other.

3 Claims, 6 Drawing Sheets

PROJECTION TYPE LIQUID CRYSTAL DISPLAY APPARATUS WITH GREEN POLARIZATION DIFFERENT THAN RED AND BLUE POLARIZATIONS

BACKGROUND OF THE INVENTION

The present invention relates to a projection type liquid crystal display apparatus which uses three transmission type liquid crystal display panels as, for example, a light valve.

Heretofore, for example, such a projection type liquid crystal display apparatus has been proposed wherein three transmission type liquid crystal display panels are used as the light valve. The transmission type liquid crystal display panels are illuminated by three primary color illuminating lights and transmission light images of three channels whose luminance is modulated by a liquid crystal display panel are re-combined by using a four-division dichroic prism so as to be projected by a projecting lens.

FIG. 1 shows an example of such an optical system. Referring to FIG. 1, a red modulating transmission type liquid crystal display panel 51R, a blue modulating liquid crystal display panel 51B and a green modulating liquid crystal display panel 51G are disposed. Image signals of three primary colors, that is, a red (R), a blue (B) and a green (G) are supplied to the liquid crystal display panels 51R, 51B, 51G, respectively.

Furthermore, polarizing plates 52R, 52B, 52G, each having a vertical polarization axis, are located at the outgoing sides of the liquid crystal display panels 51R, 51B, 51G, respectively, so that each outgoing light may be a vertical polarized light. The reason why the outgoing light from each liquid crystal display panel is a vertical axis is that the polarization axis of a light beam comprising the vertical axis makes the shielding character of the dichroic prism better.

For example, after the luminance of a red illuminating light 53R is modulated by the red modulating liquid crystal display panel 51R, a vertical polarized red outgoing light which passes through the polarizing plate 52R is incident on a four-division dichroic prism 54 comprising bonded glass blocks 54a, 54b, 54c and 54d. A red band alone of the incident light is selectively reflected by red light reflecting surfaces 55a, 55b formed on the glass blocks 54a, 54b, and then projected by a projecting lens 56.

Furthermore, after the luminance of a blue illuminating light 53B is modulated by the blue modulating liquid crystal display panel 51B, a vertical polarized blue outgoing light which passes through the polarizing plate 52B is incident on the four-division dichroic prism 54. A blue band alone of the incident light is selectively reflected by blue light reflecting surfaces 55c, 55d formed on the glass blocks 54c, 54d, and hence projected by the projecting lens 56.

Furthermore, after the luminance of a green illuminating light 53G is modulated by the green modulating liquid crystal display panel 51G, a vertical polarized green outgoing light which passes through the polarizing plate 52G is incident on the four-division dichroic prism 54. The incident light passes through the red light reflecting surfaces 55a, 55b, whereby a long wave length component thereof is attenuated. The incident light passes through the blue light reflecting surfaces 55c, 55d, whereby a short wave length component thereof is attenuated. As a result, the green band alone is selectively penetrated.

Thus, red, blue and green transmission image lights are composed of one another, and then the composed light is projected and displayed by the projecting lens 56. The reason that the shielding characteristic of the reflecting surface of the dichroic prism 54 is constructed to have the green band as a transmission channel is that a whole transmittance of the dichroic prism can be increased. An arrangement of the channel will be described below.

By the way, according to the projection type liquid crystal display apparatus shown in FIG. 1, the transmission characteristic of a blue light passing through the red light reflecting surfaces 55a, 55b of the dichroic prism 54 is shown by, for example, a curved line 61 in FIG. 2. Furthermore, the transmission characteristic of a red light passing through the blue light reflecting surfaces 55c, 55d is shown by a curved line 62 in FIG. 2.

When the green illuminating light having the band shown by a curved line 63 in FIG. 2 is incident on the dichroic prism 54, as shown in a hatched portion 64 in FIG. 2, among the long wave length components of the green illuminating light 63, some light components are reflected by the red light reflecting surfaces 55a, 55b having the transmission characteristic shown by the curved line 61.

The reflected lights become a leaked light from a green channel to a blue channel, and the leaked light illuminates a transistor element formed at the outgoing side of the blue modulating liquid crystal display panel 51B. Thus, a current leakage of the transistor or the like occurs, whereby a deterioration of an image quality such as a contrast or the like is caused.

Similarly, as shown by a hatched portion 65 in FIG. 2, among the short wave length components of the green illuminating light 63, the leaked light component reflected by the blue light reflecting surfaces 55c, 55d having the transmission characteristic shown by the curved line 62 illuminates the transistor at the outgoing side of the red modulating liquid crystal display panel 51R. Accordingly, the deterioration of the image quality such as the contrast or the like is caused.

On one hand, in order that the leaked light component at the long and short wave length sides of the green illuminating light may not illuminate the outgoing side of the blue and red modulating liquid crystal display panels, the following systems are proposed. That is, as shown in FIG. 3, a blue transmission filter 57B is disposed at the back of the polarizing plate 52B at the outgoing side of the blue modulating liquid crystal display panel 51B, or a red transmission filter 57R is disposed at the back of the polarizing plate 52R at the outgoing side of the red modulating liquid crystal display panel 51R. However, in any system, since the light transmittance is reduced, an amount of projected light is reduced.

Furthermore, in order that the leaked light component of the green illuminating light may not illuminate the outgoing side of the liquid crystal display panels for two other channels, the band of the green illuminating light is considerably reduced so that the leaked light component may not be generated. However, since the amount of green component light is reduced, the amount of projected light is reduced.

Furthermore, according to the above apparatus, the red light reflecting surfaces 55a, 55b are formed on different glass blocks 54a, 54b, and also the blue light reflecting surfaces 55c, 55d are formed on different glass blocks 54c, 54d. Accordingly, due to the difference between the characteristics of the reflecting surfaces, a tint of the green transmission light at the right side of a projecting screen is different from that at the left side, resulting in the deterioration of the image quality such as a color uniformity or the like.

SUMMARY OF THE INVENTION

In view of such aspects, it is an object of the present invention to solve the problem that in the above apparatus the leaked light component at the long wave length side of the green illuminating light illuminates the outgoing side of the blue modulating liquid crystal display panel and the leaked light component at the short wave length side of the green illuminating light illuminates the outgoing side of the red modulating liquid crystal display panel, thereby causing the current leakage of the transistor element formed at the outgoing sides of the liquid crystal display panels or the like and resulting in the deterioration of the image quality such as the contrast or the like.

To this end, according to the present invention, a polarization axis at the outgoing side of a liquid crystal panel for one transmission channel and polarization axes at the outgoing sides of the liquid crystal panels for the other two reflected channels are made perpendicular to each other, it is possible to prevent the leaked light from the transmission channel from illuminating the liquid crystal panels for the other two reflected channels.

Furthermore, a transmission band of the transmission channel can be extended thereby, so that the amount of projected light can be increased. Moreover, the amount of projected light of the transmission channel is increased, whereby the characteristic difference of respective reflecting surfaces of a dichroic prism can be apparently reduced, so that the image quality such as the color uniformity or the like can be improved.

DESCRIPTION OF THE PREFERRED EMBODIMENT

According to a projection type liquid crystal display apparatus of the present invention, a dichroic prism transmits one channel of a transmission image light, and the other two channels are reflected by the dichroic prism, so that the transmission image lights are synthesized or composed. A polarization axis of the one channel of the transmission image light passing through the dichroic prism is set to a first axis, and the polarization axes of the other two channels of the transmission image lights reflected by the dichroic prism are set to a second axis. The first and second axes are constructed so as to be perpendicular to each other.

Figure 1:
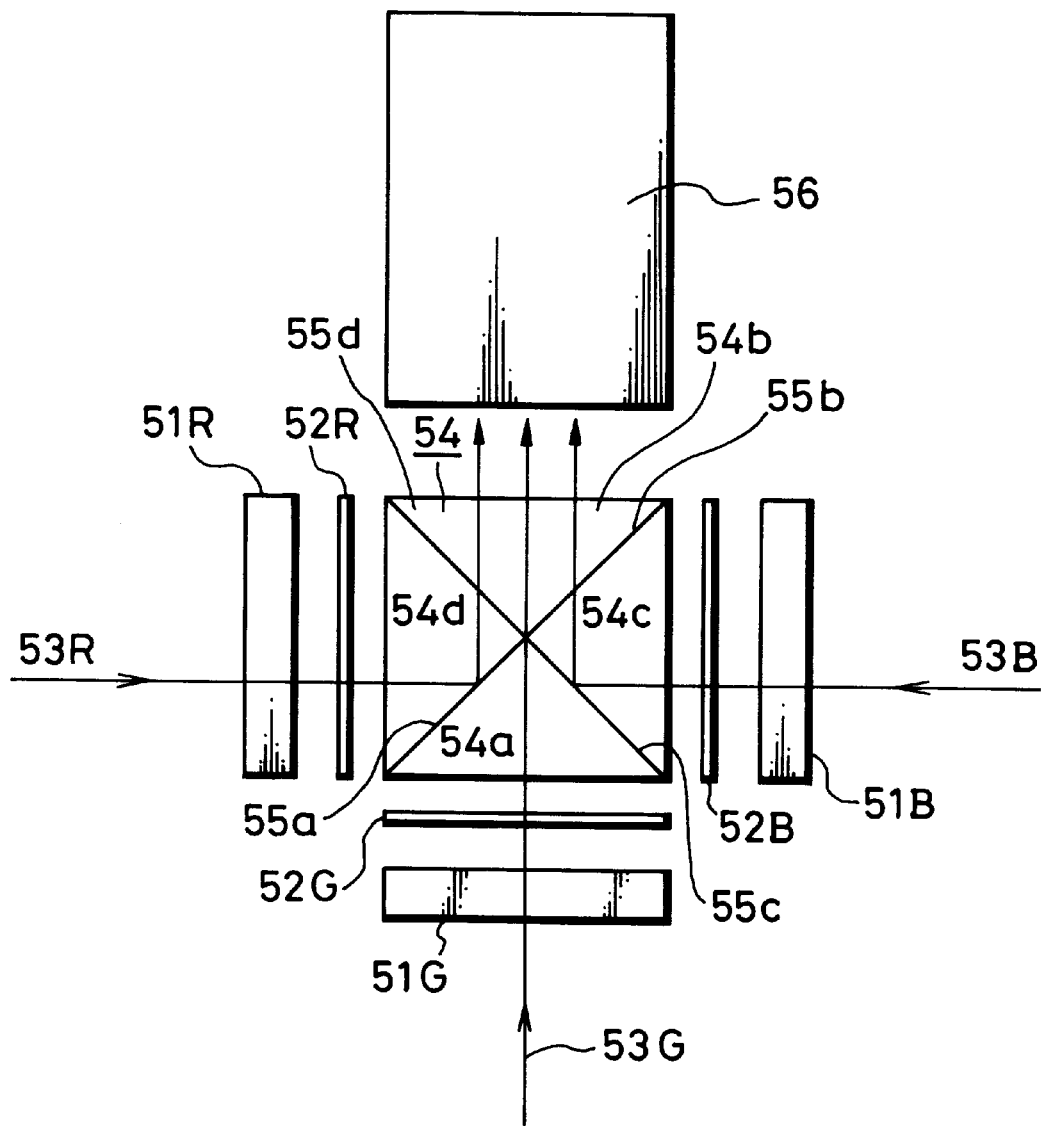
FIG. 1 is a structural diagram showing an optical system of a projection type liquid crystal display apparatus.
Figure 2:
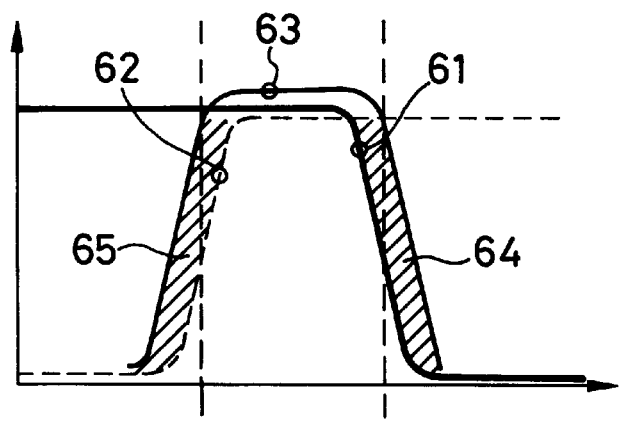
FIG. 2 is a diagram showing a reflecting film characteristic and a leaked light component of the projection type liquid crystal display apparatus shown in FIG. 1.
Figure 3:
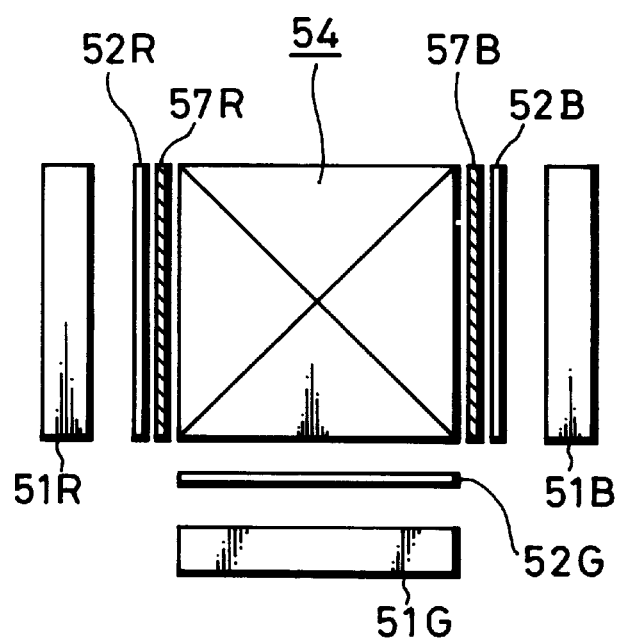
FIG. 3 is a structural diagram showing a measurement for shielding a leaked light component.
Figure 4:
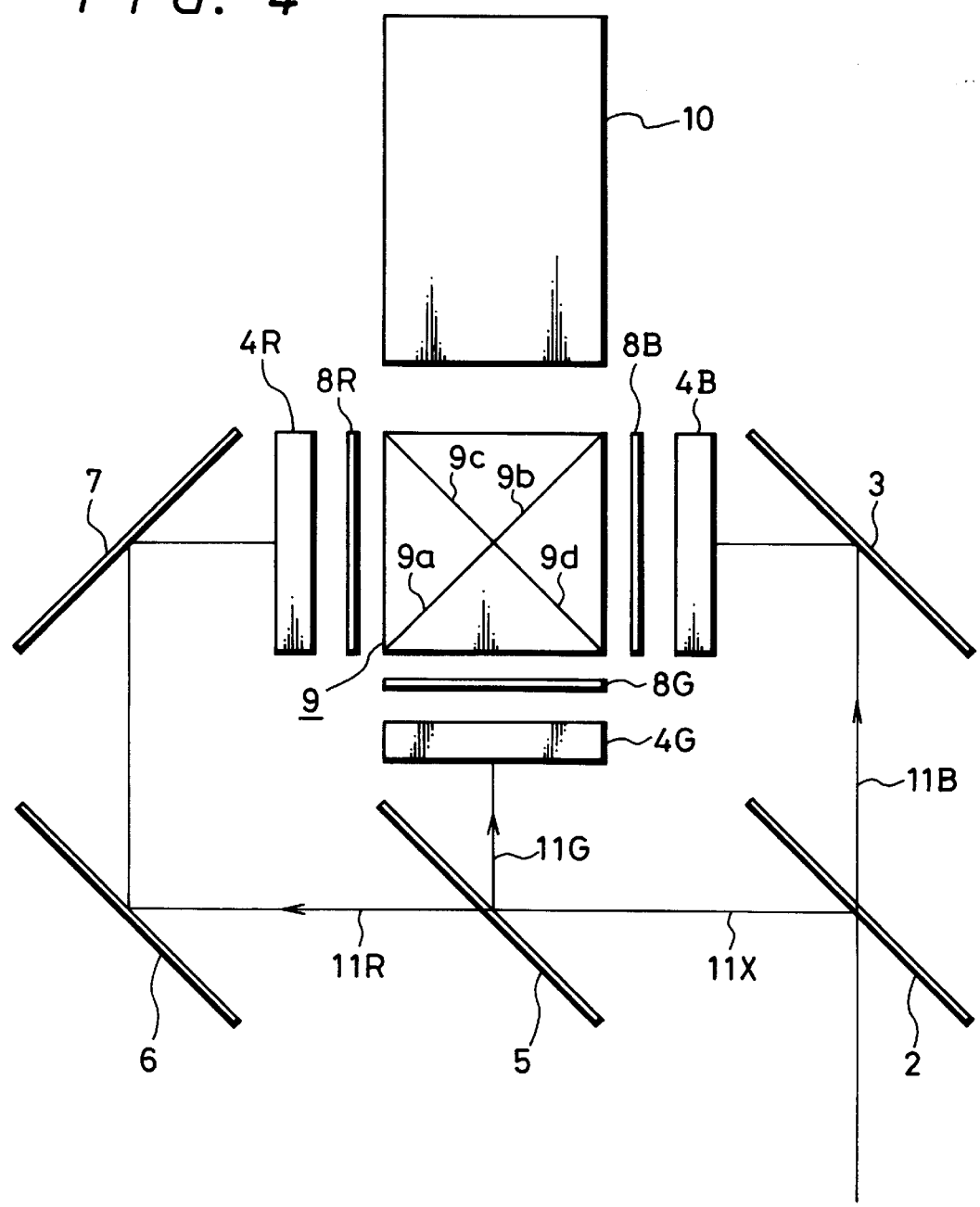
FIG. 4 is a structural diagram of an embodiment of a projection type liquid crystal display apparatus to which the present invention is applied.

Hereinafter, the present invention will be described with reference to the accompanying drawings. FIG. 4 is a structural diagram showing an example of an optical system of the projection type liquid crystal display apparatus which the present invention is applied to.

Figure 5A:
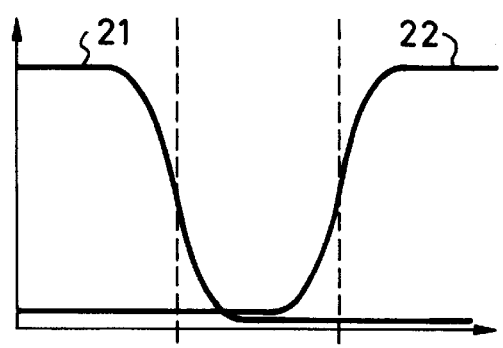
FIGS. 5A, 5B, 5C, 5D are diagrams used to explain an operation of the embodiment of FIG. 4.

Referring to FIG. 4, a light from a light source 1 is split by a blue transmission dichroic mirror 2 into a blue illuminating light 11B and a remaining primary color illuminating light 11X. The blue illuminating light 11B is reflected by a total reflection mirror 3, and it is incident on a blue modulating liquid crystal display panel 4B. A transmission characteristic of the blue transmission dichroic mirror 2 is shown by a curved line 21 in FIG. 5A.

On one hand, the remaining primary color illuminating light 11X is reflected by a green reflection dichroic mirror 5, and it is split into a green illuminating light 11G and a remaining red illuminating light 11R. The green illuminating light 11G is incident on a green modulating liquid crystal display panel 4G. Furthermore, the red illuminating light 11R is reflected by total reflection mirrors 6, 7, and it is incident on a red modulating liquid crystal display panel 4R. The transmission characteristic of the green reflection dichroic mirror 5 is shown by a curved line 22 in FIG. 5A.

Furthermore, the blue modulating liquid crystal display panel 4B, the red modulating liquid crystal display panel 4R and polarizing plates 8B, 8R each having a vertical polarization axis and located at outgoing sides of liquid crystal panels 4B, 4R, respectively, are constructed in such a manner that the polarization axes of the outgoing lights thereof become vertical. Accordingly, the outgoing lights become a blue and a red transmission image light each having a vertical polarization axis, respectively. In bands of the outgoing lights from the liquid crystal display panels 4B and 4R, a blue light has a component shown by a curved line 23 in FIG. 5B and a red light has a component shown by a curved line 24 in FIG. 5B in accordance with the characteristic of the dichroic mirrors 2 and 5 (the curved lines 21 and 22 in FIG. 5A).

On one hand, the green modulating liquid crystal display panel 4G and a polarizing plate 8G located at its outgoing side and having a horizontal polarization axis are constructed in such a manner that the polarization axis of the outgoing light becomes horizontal. Accordingly, he outgoing light therefrom becomes a green transmission image light whose polarization axis is horizontal. In the band of the outgoing light from the liquid crystal display panel 4G, a green light has a component shown by a curved line 25 in FIG. 5B in accordance with the characteristic of the dichroic mirrors 2 and 5 (the curved lines 21, 22 in FIG. 5A).

That is, in the above projection liquid crystal display apparatus, the first polarization axis at the outgoing light side of the liquid crystal display panel for one transmission channel comprises a horizontal axis. The second polarization axes at the outgoing light sides of the liquid crystal display panels the other two reflected channels comprise a vertical axis. The first and second polarizing axes are constructed so as to be perpendicular to each other.

Furthermore, the outgoing polarized lights from the three liquid crystal display panels 4B, 4R, 4G are incident on, for example, a four-division dichroic prism 9. An outgoing red image light from the red modulating liquid crystal display panel 4R is reflected by red reflecting films 9a, 9b of the dichroic prism 9, and it is incident on a projecting lens 10, and then projected thereby.

Furthermore, an outgoing blue image light from the blue modulating liquid crystal display panel 4B is reflected by blue reflecting films 9c, 9d of the dichroic prism 9, and it is incident on a projecting lens 10, and then projected thereby.

Furthermore, an outgoing green image light from the green modulating liquid crystal display panel 4G passes through the red reflecting films 9a, 9b and the blue reflecting films 9c, 9d of the dichroic prism 9, and it is incident on the projecting lens 10, and then it is projected thereby.

Figure 5B:
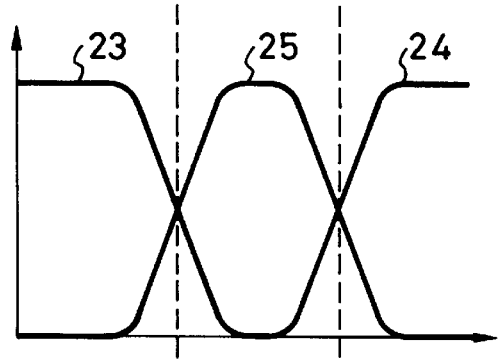
Figure 5C:
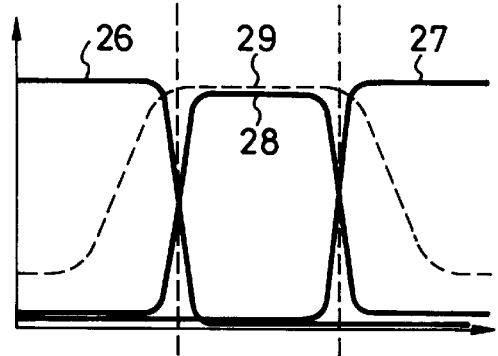

In this case, a reflection characteristic of the blue reflecting films 9c, 9d relative to a vertical polarized light is shown by a curved line 26 in FIG. 5C. A reflection characteristic of the red reflecting films 9a, 9b relative to the vertical polarized light is shown by a curved line 27 in FIG. 5C. The curved lines are combined to each other, so that a transmission characteristic of the transmission channel relative to the vertical polarized light is obtained and it is shown by a curved line 28 in FIG. 5C. In this case, the transmission characteristic relative to a horizontal polarized light is shown by a curved line (broken line) 29 in FIG. 5C in accordance with a difference in a shielding characteristic of the dichroic prism 9.

Figure 5D:
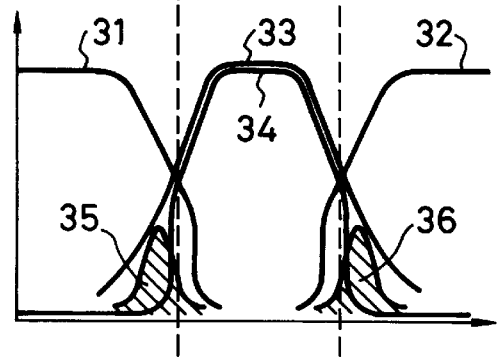

Referring to FIGS. 5B and 5C, the curved lines 23 and 26 are combined with each other, so that the component of the finally projected blue image light is shown by a curved line 31 in FIG. 5D. The curved lines 24 and 27 are combined with each other, so that the component of the red image light is shown by a curved line 32 in FIG. 5D.

On one hand, the curved lines 25 and 29 are combined with each other, so that the component of the horizontal polarized green image light is obtained. In this case, since the green image light is not shielded by the dichroic prism 9, the component of the green image light is shown by a curved line 33 in FIG. 5D. That is, in this case, the green image light is not shielded (reflected) by the dichroic prism 9, and a remaining light due to the shield (reflection) is not leaked to the other two channels.

Furthermore, even if a slight leaked light is generated, since the component of the leaked light is the outgoing light from the green modulating liquid crystal display panel 4G, the light has a horizontal polarization axis. Accordingly, the horizontal polarization axis is perpendicular to the vertical axes of the polarizing plates 8R, 8B at the outgoing sides of the red and blue crystal display panels 4R, 4B. Therefore, since the leaked light is absorbed in the polarizing plates 8R, 8B, it does not reach a transistor at the outgoing side of the liquid crystal display panels 4R, 4B.

Accordingly, since the apparatus is so constructed that the polarization axis at the outgoing side of the liquid crystal display panel for the one transmission channel and the polarization axes at the outgoing sides of the liquid crystal display panels for the other two reflected channels are perpendicular to each other, it is possible to prevent the leaked light from the transmission channel from illuminating the liquid crystal display panels for the other two reflected channels.

That is, in the apparatus, the transmission characteristic of the one transmission channel for the dichroic prism has a very wide band. Since the band component of the green illuminating light is not shielded by the transmission characteristic of the dichroic prism, less light is leaked to the liquid crystal display panels for the other two reflected channels.

Furthermore, when the slightly remaining leaked green-illuminating light arrives at the outgoing sides of the liquid crystal display panels for the two reflected channels, the polarization axis of the leaked light is perpendicular to the polarization axes of the polarizing plates located at the outgoing sides of the liquid crystal display panels for the two reflected channels. Accordingly, the leaked light is absorbed in the polarizing plates at the outgoing sides, and it does not reach the transistors at the back of the polarizing plates.

Accordingly, in the apparatus, the leaked light from the transmission channel does not illuminate the outgoing sides of the liquid crystal display panels for the other two reflected channels. Thus, it is possible to solve such a conventional problem that a transistor element formed at the outgoing sides of the liquid crystal display panels is illuminated by the leaked light whereby a current leakage or the like occurs with the result that a degrading of the image quality such as a contrast or the like occurs.

Furthermore, according to the above-described apparatus, for example, if the outgoing light from the green modulating liquid crystal display panel 4G comprises the vertical polarization axis, the above-mentioned curved lines 25 and 28 are combined to each other so that the component of the green image light is shown by a curved line 34 in FIG. 5D. In this case, since the remaining light of the green image light 25 shielded by the curved line 28 leaks over red and blue bands, the remaining light is the leaked light to the other two channels.

That is, the leaked light to the red channel is reflected by the red reflecting films 9a and 9b, so that the leaked light has the component shown by a hatched area 36 in FIG. 5D. The leaked light to the blue channel is reflected by the blue reflecting films 9c and 9d, so that the leaked light has the component shown by a hatched area 35 in FIG. 5D. The leaked lights are vertically polarized light, and coincide with the polarization axes of the polarizing plates at the outgoing sides of the liquid crystal display panels for the two reflected channels. Accordingly, the leaked light passes through the polarizing plates at the outgoing sides, and illuminates and badly affects the transistors of the liquid crystal display panels.

On the contrary, the apparatus of the present invention is constructed so that the polarization axis at the outgoing side of the liquid crystal display panel for the one transmission channel is perpendicular to the polarization axes at the outgoing sides of the liquid crystal display panels for the other two reflected channels. Accordingly, it is possible to prevent the leaked light from the one transmission channel from illuminating the liquid crystal display panels for the other two reflected channels. It is hence possible to solve the problem of image deterioration due to the illuminated transistor element formed at the outgoing sides of the liquid crystal display panels.

According to the apparatus of the present invention, as understood by comparing the curved line 33 with the curved line 34 in FIG. 5D, the band of the green image light shown by the curved line 33 is wider than that shown by the curved line 34. Thus, the amount of projected light of the outgoing green image light 25 from the dichroic prism 9 is increased, whereby a luminance of a displayed screen can be improved.

Furthermore, according to the above-mentioned apparatus, if the transmission characteristics of the red reflecting films 9a and 9b of the dichroic prism 9 are different from each other, for example, when all the channels comprise the vertical axes, the shielding characteristics at the right shoulder portion of the curved line 28 of the red reflecting films 9a and 9b are shifted from each other. This appears as the shielding characteristic at the right shoulder portion of the curved line 34.

By the way, as described above, when the transmission channel comprises the horizontal axis, the shielding characteristic at the right shoulder portion of the curved line 29 is influenced. The characteristic at the right shoulder portion of the green image light 25 at a short wave side from the right shoulder portion of the former curved line 29 is less influenced. Accordingly, as a result, the deviation of the characteristic is not generated at the right shoulder portion of the curved line 33.

The same occurs at the blue reflecting films 9c and 9d. In this case, it is the shielding characteristic at the left shoulder portion of the curved line 29 which is influenced. When the transmission channel comprises the horizontal axis, the characteristic is less influenced at the left shoulder portion of the green image light 25 at a long wave side from the left shoulder portion of the former curved line. Thus, as a result, the deviation of the characteristic is not generated at the left shoulder portion of the curved line 33.

Accordingly, even if the differences or deviations between the red reflecting films 9a and 9b and between the blue reflecting films 9c and 9d are generated, the differences have less influence upon the characteristic of the green image light 25. As a result, a color uniformity of the displayed screen can be improved.

The red channel comprising the red modulating liquid crystal display panel 4R, the polarizing plate 8R at the outgoing side thereof, and the red reflecting films 9a and 9b can be replaced by the blue channel comprising the blue modulating liquid crystal display panel 4B, the polarizing plates 8B at the outgoing side thereof, and the blue reflecting films 9c and 9d as shown in FIG. 4 described above. Accordingly, even if the red and blue channels are not arranged as shown in FIG. 4 attached to the specification, an effect of the present invention can be obtained.

Figure 6A:
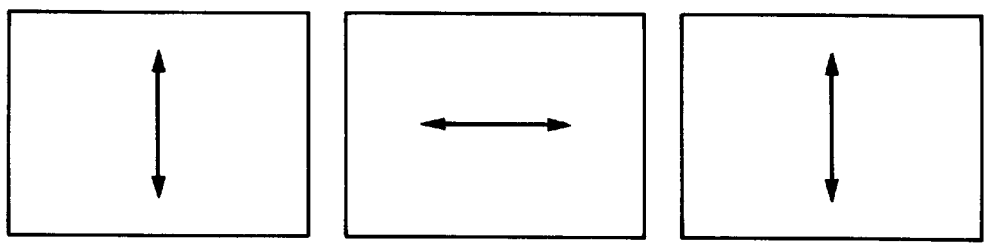
FIG. 6A shows the polarization axis of each channel according to the embodiment shown in FIG. 4 viewed from the outgoing side and FIGS. 6B, 6C are diagrams used for explaining other embodiments.
Figure 6B:
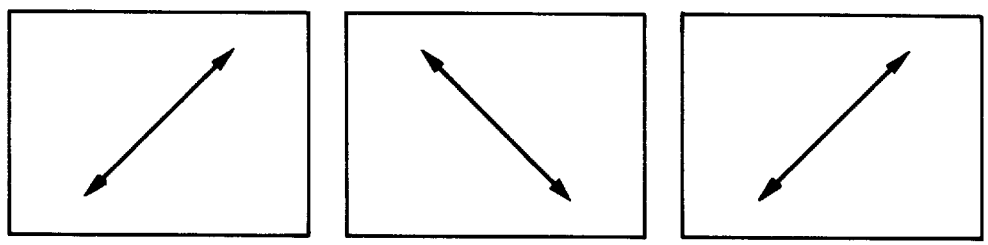
Figure 6C:
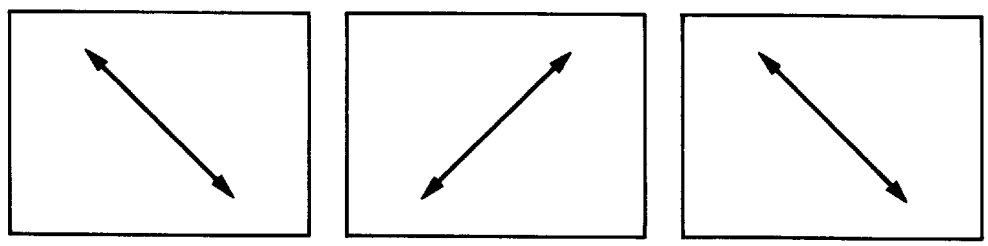

Furthermore, FIG. 6A shows the polarization axis of each channel according to an embodiment shown in FIG. 4 viewed from the outgoing side. FIGS. 6B and 6C show other embodiments in which the polarization axes of the liquid crystal display panels are located at other angles, resulting in the polarization axes of the one transmission channel and the two reflected channels being perpendicular to each other.

That is, in the cases, the first axis is an axis clockwise by θ° relative to the horizontal axis, and the second axis is an axis counterclockwise by 90–θ° relative to the horizontal axis. Accordingly, in the examples, since the leaked light is shielded by the polarizing plate at the outgoing side, the current leakage of the transistor of the liquid crystal display panel can be prevented.

Furthermore, according to the above-described apparatus, for example, if the polarization axis of each channel is fixed, a polarization axis rotating element such as a so-called wave length plate or the like is used so as to rotate the polarization axis, whereby the above first and second polarization axes can be made perpendicular to each other.

Figure 7:
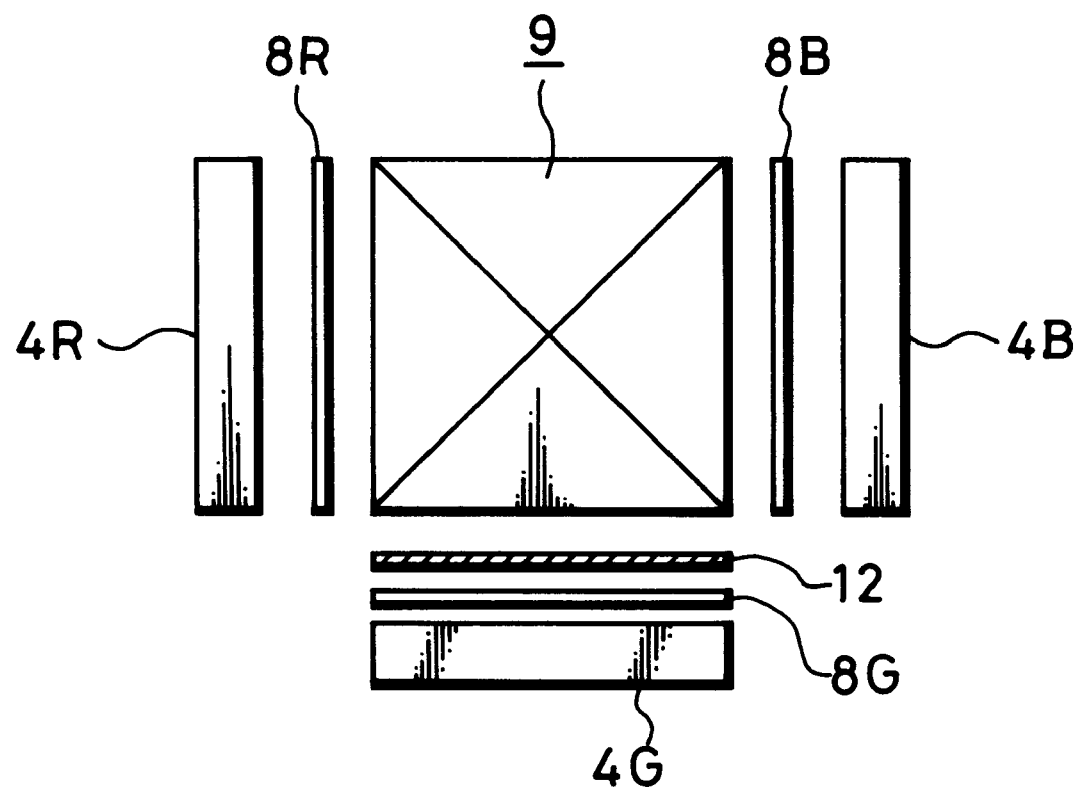
FIG. 7 is a structural diagram for explaining another embodiment.

That is, FIG. 7 shows, for example, the case that all the channels comprise the vertical axis. Accordingly, in this case, for example, a ½ wave length plate 12 is disposed at the outgoing side of the polarizing plate 8G (having the vertical polarization axis) located at the outgoing side of the green modulating liquid crystal display panel 4G. Thus, the polarization axis of the outgoing green image light from the polarizing plate 8G is rotated to the vertical from the horizontal, whereby the horizontal polarized green image light can be formed.

In such a manner, according to the projection type liquid crystal display apparatus described above, the polarization axis of the one channel of the transmission image light which passes through the dichroic prism is set to the first axis, and the polarization axes of the other two channels of the transmission image lights reflected by the dichroic prism are set to the second axis. The first and second axes are constructed so as to be perpendicular to each other. Thus, it is possible to prevent the leaked light from the one transmission channel from illuminating the liquid crystal display panels for the other two reflected channels.

Furthermore, the transmission band of the one transmission channel can be extended thereby, so that the amount of projected light can be increased. Furthermore, the amount of projected light of the transmitted channel is increased, whereby the characteristic difference of respective reflecting surfaces of the dichroic prism can be apparently reduced, so that an image quality such as the color uniformity or the like can be enhanced.

That is, according to the projection type liquid crystal display apparatus of the preset invention, since the transmission characteristic of the one transmission channel for the dichroic prism becomes the very wide band and the band component of the green illuminating light is not shielded by the transmission characteristic of the dichroic prism, there is less leaked light to the liquid crystal display panels for the other two reflected channels.

Furthermore, when the slightly remaining leaked light arrives at the outgoing sides of the liquid crystal display panels for the two reflected channels, the polarization axis of the leaked light is perpendicular to the polarization axes of the polarizing plates located at the outgoing sides of the liquid crystal display panels for the two reflected channels. Accordingly, the leaked light is absorbed in the polarizing plates at the outgoing sides, and it does not reach the transistor at the back of the polarizing plates. Therefore, the leakage is not generated, and the deterioration of image quality such as the contrast can be prevented.

Furthermore, since the polarization axis of the outgoing light from the liquid crystal display panel for the one transmitted channel comprises the horizontal axis, the transmission band of the green image light for the dichroic prism is expanded. Therefore, the band of the green illuminating light is shielded by a different band due to a glass block having the characteristic difference of the reflecting surfaces, whereby the difference of a tint is not generated, so that it is possible to prevent the deterioration of the color uniformity from being generated. As a result, the color uniformity can be prevented from being deteriorated. Furthermore, since the band of the green image light is basically extended, the amount of projected light can be increased.

As described above, according to the present invention, without reducing the amount of projected light, the leaked light from the one transmission channel to the two reflected channels can be avoided. Furthermore, since the transmission band of the one transmission channel is extended, the amount of projected light is increased. Moreover, since the characteristic of the right and left films of the glass block of the dichroic prism does not have an influence upon the characteristic of the image light, the color uniformity can be enhanced.

Having described a preferred embodiment of the present invention with reference to the accompanying drawings, it is to be understood that the present invention is not limited to the above-described embodiments and that various changes and modifications can be effected therein by one skilled in the art without departing from the spirit or scope of the present invention as defined in the appended claims.

What is claimed is:

1. A projection type liquid crystal display apparatus comprising:

a projecting lens;

at least three transmission type liquid crystal display panels; and a four-division dichroic prism, wherein said three transmission type liquid crystal display panels are driven by image signals of three primary colors, respectively, and said three transmission type liquid crystal display panels are illuminated by three primary color light beams, respectively, for obtaining transmission image light beams having three channels whose luminance is modulated, respectively, and said dichroic prism is used for synthesizing said transmission image light beams and a composed image light beam is projected via said protecting lens, wherein one channel of said transmission image light beams passes through said dichroic prism, and two other channels of said transmission image light beams are reflected by said dichroic prism, for synthesizing said transmission image light beams, and wherein a polarization axis of said transmission image light beams of one channel passing through said dichroic prism is set to a first polarization axis, polarization axes of said transmission image light beams of said two other channels reflected by said dichroic prism are set to a second polarization axis, and said first and second polarization axes are made perpendicular to each other, wherein said first polarization axis is an axis rotated clockwise by θ° relative to the horizontal axis, and said second polarization axis is an axis rotated counterclockwise by 90−θ° relative to the horizontal axis.

2. The projection type liquid crystal display apparatus according to claim 1, wherein said first polarization axis is a horizontal axis, and said second polarization axis is a vertical axis.

3. A projection type liquid crystal display apparatus comprising:

a protecting lens;

at least three transmission type liquid crystal display panels; and a four-division dichroic prism, wherein said three transmission type liquid crystal display panels are driven by image signals of three primary colors, respectively, and said three transmission type liquid crystal display panels are illuminated by three primary color light beams, respectively, for obtaining transmission image light beams having three channels whose luminance is modulated, respectively, and said dichroic prism is used for synthesizing said transmission image light beams and a composed image light beam is projected via said projecting lens, wherein one channel of said transmission image light beams passes through said dichroic prism, and two other channels of said transmission image light beams are reflected by said dichroic prism, for synthesizing said transmission image light beams, and wherein a polarization axis of said transmission image light beams of one channel passing through said dichroic prism is set to a first polarization axis, polarization axes of said transmission image light beams of said two other channels reflected by said dichroic prism are set to a second polarization axis, and said first and second polarization axes are made perpendicular to each other, further comprising a polarization axis rotating element, and wherein said polarization axis rotating element is disposed at an outgoing side of one of said three transmission type liquid crystal display panels, and said polarization axis rotating element is used for making a polarization axis of said transmission image light beams of one channel passing through said dichroic prism perpendicular to polarization axes of said transmission image light beams of said two other channels reflected by said dichroic prism.

\* \* \* \* \*